United States Patent Office 2,818,404
Patented Dec. 31, 1957

2,818,404

CURING OF POLYURETHANES WITH A DI(ISOCYANATOARYL) UREA

Frederick B. Hill, Jr., New Castle, Del., assignor to E. I. du Pont de Nemours and Company, Wilmington, Del., a corporation of Delaware No Drawing. Application June 7, 1954
Serial No. 435,055

14 Claims. (Cl. 260—75)

This invention relates to the preparation of polyurethane elastomers, and more particularly to a method of curing or vulcanizing such products.

Elastomers having valuable properties may be prepared by reacting a high molecular weight polyalkylene ether glycol with a molar excess of an organic diisocyanate to form a linear polymer containing urethane linkages, and then reacting this polymer with a chain-extending agent containing a plurality of active hydrogen atoms, such as water, a diamine, a hydroxyamine, and the like, as disclosed and claimed in my copending application Serial No. 365,270, filed June 30, 1953. Similar products are obtained by reacting together a high molecular weight polyalklyene ether bis-chloroformate, an organic diamine and phosgene, as described in copending application Serial No. 388,454, of Carter and Ernsberger, filed October 26, 1953. Other useful polyurethane elastomers may be prepared by reacting a high molecular weight polyester of at least one glycol and at least one dicarboxylic acid with a molar excess of an organic diisocyanate and a chain-extending agent. Such products are described, for example, by Bayer et al. in Angewandte Chemie 62, 57–66 (1950).

All of these products may be cured by heating, ordinarily under pressure, if the reaction product contains free isocyanate groups. Under these conditions, the free isocyanate groups are believed to react with active hydrogen atoms in the polymer to produce cross-linking of the polymer chains. If the proportions of reactants have been such that few free isocyanate groups are present, or if the uncured reaction product has been stabilized against premature curing by the addition of some material such as a primary or a secondary amine which reacts with and ties up the free isocyanate groups, it is necessary to add a curing agent prior to heating to effect vulcanization. A diisocyanate may serve as this curing agent. Difficulty is sometimes encountered in the use of the conventional diisocyanates because of their great reactivity which results in premature curing or "scorching" of the elastomer before the curing agent can be thoroughly incorporated. This leads to non-uniformity of cure and interferes with the production of molded articles, since it may not be possible to force the partially cured product to fill the mold completely. Instead of a monomeric diisocyanate, it is frequently advantageous to use the corresponding dimer, which is less reactive at low temperatures, but which is split at the temperature of the cure into two molecules of the original diisocyanate. Even with these compounds, however, scorching may occur on the rubber mill before the agent is completely mixed in.

It is an object of this invention to provide a method for curing elastomers of the type described which minimizes the tendency toward scorching and which may be carefully controlled to give the desired degree of vulcanization. It is a further object of this invention to provide a process for curing in which cross-linking is facilitated by the presence in the curring agent of additional active hydrogen atoms. Further objects will appear from the description of this invention which follows.

According to the present invention, an uncured polyurethane reaction product containing a plurality of intralinear groups having formula weights of at least 732 and selected from the class consisting of polyoxyalkylene and polyester groups is cured by mixing 100 parts by weight of the reaction product with from 1 to 20 parts by weight of a di(isocyanatoaryl) urea having the formula:

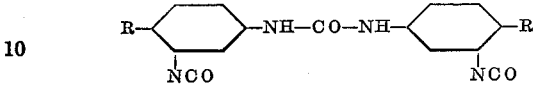

in which R represents a member of the class consisting of lower alkyl and lower alkoxy radicals and chlorine atoms and thereafter heating the mixture at a temperature between 80 and 175° C. to produce a vulcanized elastomer.

In a preferred embodiment of this invention, a polytetramethylene ether glycol having a molecular weight between 750 and 3500 is reacted with a molar excess of 2,4-tolylene diisocyanate and with water, and 100 parts by weight of the uncured reaction product are thereafter mixed with from 1 to 20 parts by weight of di(3-isocyanato-4-methylphenyl) urea and the mixture is heated at a temperature between 90 and 150° C. to effect vulcanization.

In another preferred embodiment, a polyester formed from ethylene glycol, 1,2-propylene glycol and adipic acid, having terminal hydroxy groups and a molecular weight between 750 and 3500, is reacted with a molar excess of an arylene diisocyanate and with a chain-extending agent containing a plurality of active hydrogen atoms, no more than two atoms in the molecule having active hydrogen attached thereto, and 100 parts by weight of the uncured reaction product are thereafter mixed with from 1 to 20 parts of di(3-isocyanato-4-methylphenyl) urea and the mixture is heated at a temperature between 90 and 150° C. to effect a cure.

In carrying out this process, the uncured elastomeric reaction product is preferably milled on a rubber mill to form a smooth band, the required amount of the di(isocyanatoaryl) urea is added on the mill, and milling is continued until the mixture becomes homogeneous. The elastomer is then cured by heating. The curing step is ordinarily conducted in a mold under a pressure varying from about 50 to 100 pounds up to 1000 pounds per square inch or higher. It is only necessary to use enough pressure to force the elastomer to fill the mold. The time required varies according to the temperature and the nature and proportions of the particular ingredients employed, but is ordinarily from about 15 to 60 minutes. Curing may also be effected without the application of pressure. The compounded elastomer may be sheeted out and calendered either alone or onto a substrate such as a plastic or textile and may then be heated to produce the cure.

The polymeric reaction products which may be cured according to this invention include those which are prepared from polyalkylene ether glycols, diisocyanates and chain-extending agents, as disclosed and claimed in my application Serial No. 365,270, filed June 30, 1953. The term "polyalkylene ether glycol" as used throughout the specification and claims refers to a polyalkylene ether which contains terminal hydroxy groups. These compounds are derived from the polymerization of cyclic ethers such as alkylene oxides or dioxolane or from the condensation of glycols. They are sometimes known as polyalkylene glycols or polyalkylene oxide glycols. Those useful in preparing the products of this invention may be represented by the formula $HO(RO)_nH$, in which R stands for an alkylene radical and $n$ is an integer sufficiently large that the molecular weight of the compound is at least 750, i. e., large enough that the polyoxyalkylene group —(RO)$_n$— has a formula weight of at least 732. Not all of the alkylene radicals present need be the same. Glycols containing a mixture of radicals, as in the compound HO(CH$_2$OC$_2$H$_4$O)$_n$H can be used. These glycols are either viscous liquids or waxy solids. To be of value in preparing elastomers according to this invention, the molecular weight of the glycol should be at least 750 and may be as high as 10,000. It is preferably between 750 and 3500. Polytetramethylene ether glycol, also known as polybutylene ether glycol, is the preferred glycol. Polyethylene ether glycol, polypropylene ether glycol and poly-1,2-dimethylethylene ether glycol are representative of other operable compounds.

Any of a wide variety of diisocyanates may be used in the polymerization. Aromatic diisocyanates, such as 2,4-tolylene diisocyanate, 4,4'-methylene-bis (phenyl isocyanate), 1,5-naphthylene diisocyanate and m-phenylene diisocyanate, are preferred. Aliphatic compounds such as hexamethylene diisocyanate and tetramethylene diisocyanate, and alicyclic compounds such as 1,4-cyclohexylene diisocyanate are also operable.

The chain-extending agent contains a plurality of active hydrogen atoms, no more than two atoms in the molecule having active hydrogen attached thereto. It is preferably water. By "active hydrogen atoms" is meant those hydrogen atoms which display activity according to the well-known Zerewitinoff test as described by Kohler in J. Am. Chem. Soc. 49, 3181 (1927). When water is employed as the chain extender it is capable of reacting with two isocyanate groups with the evolution of carbon dioxide to form a urea group linking the polymer fragments to which the isocyanate groups were attached. Urea linkages are also formed if a diamine such as 2,4-tolylenediamine or ethylene diamine is used as the chain-extending agent. Other useful chain extenders include ethylene glycol, adipamide, p-aminobenzoic acid, monoethanolamine, 1,4-cyclohexanedisulfonamide, succinic acid, and hydroxypropionic acid.

In the preparation of the polymer, an excess of the diisocyanate over the polyalkylene ether glycol is used, which may be only a slight excess or may be up to a 12:1 molar ratio. The glycol and the diisocyanate are ordinarily reacted by heating with agitation at a temperature of between 70° and 120° C. The chain-extending agent is then added and heating and mixing are continued at about 80° to 100° C. During this period the molecular weight of the reaction product increases and the mass gradually forms rubbery chunks. It is then removed from the mixer and sheeted out on a rubber mill. If all of the free isocyanate groups have not reacted with the glycol or the chain-extending agent, the elastomer will have a tendency to cure rather rapidly. If the reaction product is to be stored prior to the final curing step, it is then necessary to stabilize it by adding some material such as primary or secondary nitrogen base in amount sufficient to react with the remaining free isocyanate groups. This stabilized polymer and the self-stabilized polymer which results when enough glycol and chain-extending agent have been used to tie up all the isocyanate groups may be stored for considerable periods without losing their ability to form a smooth band when milled on a rubber mill. These stable polymers may be converted to vulcanized products by incorporating therewith the di(isocyanatoaryl) urea and heating as previously described. If the stabilized polymer contains substantial amounts of excess stabilizer or chain-extending agents which will react with isocyanate groups, it is necessary to take this into account and add an increased amount of curing agent in order to have a sufficient amount of the curing agent available for cross-linking of the elastomer. The addition of the curing agent of this invention is frequently desirable even with uncured products which are not stable. Although such products contain free isocyanate groups, these groups may be too few in number or attached to too large molecular structures to provide effective curing.

Many procedural variations are possible in the preparation of the elastomers which may be cured according to this process. These variations are further described in my application Serial No. 365,270, filed June 30, 1953. In that application and also in pending application Serial No. 388,454 of Carter et al., the formation of elastomers by the reaction of a high molecular weight polyalkylene ether bis-chloroformate, an organic diamine and phosgene is described. By choosing suitable proportions of ingredients, products can be obtained in this way which are substantially identical with those made from the corresponding polyalkylene ether glycol, diisocyanate and water. These products may also be cured advantageously with di(isocyanatoaryl) ureas according to the process of this invention.

Also included in the products which may be cured according to this invention are those made from a high molecular weight, substantially linear polyester, an organic diisocyanate, and a chain-extending agent of the type previously described. Products of this sort are described in the aforementioned Bayer article in Angewandte Chemie, and in U. S. Patents 2,621,166, 2,625,531 and 2,625,532. The polyesters must have molecular weights of at least 750 and are prepared by reacting together glycols such as ethylene glycol, 1,2-propylene glycol, 2,3-butylene glycol, and 1,6-hexylene glycol, and dicarboxylic acids such as adipic, pimelic, sebacic, oxalic and phthalic acids and decamethylene dicarboxylic acid. The polyesters may be represented by the formula HO[R·OOC·R'·COO]$_n$ROH, in which R and R' are hydrocarbon radicals derived from the glycol and dicarboxylic acid respectively and $n$ is an integer large enough that the molecular weight of the compound as a whole is at least 750 and that the polyester group —[R·OOC·R'·COO]$_n$·RO— has a formula weight of at least 732. The polyester resulting from reaction of adipic acid with a mixture of ethylene and propylene glycols is preferred. In the preparation of these polyesters, the glycol is used in at least slight excess so that the polyesters contain terminal hydroxyl groups which are available for reaction with the isocyanates. The same diisocyanates, chain-extending agents and reaction conditions useful in preparing elastomers from the polyalkylene ether glycols are also useful with the polyesters.

As stated before, the curing agents which are used in the process of this invention are di(isocyanatoaryl) ureas having the formula:

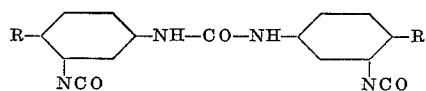

in which R is lower alkyl, lower alkoxy or chlorine. The preferred agent is di(3-isocyanato-4-methylphenyl) urea. Other usable members of this class of compounds include di(3-isocyanato-4-ethylphenyl) urea, di(3-isocyanato-4-n-butylphenyl) urea, di(3-isocyanato-4-methoxyphenyl) urea, di(3-isocyanato-4-ethoxyphenyl) urea, and di(3-isocyanato-4-chlorophenyl) urea. No reason is known why members of this class in which R represents a higher alkyl or alkoxy group could not be operable, but those in which the substituent R contains no more than about 4 carbon atoms are more readily available and are preferred. These compounds and a method of preparing them are disclosed and claimed in U. S. Patent 2,757,185.

The process of this invention is illustrated by the following examples in which parts are by weight.

*Example 1*

1050 parts of a polyethylene ether glycol of average molecular weight 1000 and containing 3.5 parts of water is heated in a Werner-Pfleiderer mill to about 80° C. and 2.62 parts of benzene sulfonyl chloride are added. 548.1 parts of 2,4-tolylene diisocyanate are then added and milling is continued for 1 hour at 80–100° C. The benzenesulfonyl chloride acts to control the reaction. There are then added 69.3 parts of water and 8.3 parts of pyridine, which serves as a catalyst for the chain elongation, and milling is continued for about 12 minutes at 80–100° C. The mass forms rubbery chunks which break away from the mill.

One hundred (100) parts of the polymer are mixed on a cold rubber mill with 2 parts of di(3-isocyanato-4-methylphenyl) urea and then heated in a mold under pressure at 134° C. for 30 minutes. A rubbery slab of amber color is obtained which shows the following properties when tested at 25° C. in water:

Tensile strength at the break, lbs./sq. in _____ 2300
Modulus at 300% elongation, lbs./sq. in _____ 710
Elongation at the break, percent _____ 570

Example 2

300 parts of the polymer prepared as described in Example 1 are put on a rubber mill and milled to a smooth band. There are then added 6 parts of piperidine which is intimately mixed in. This stabilizes the polymer so that it will not precure on standing.

The polymer is separated into three portions of 100 parts each. They are separately mixed on a rubber mill with 1, 2 and 4 parts of di(3-isocyanato-4-methylphenyl) urea. The compounded polymers are cured in a mold at 134° C. under pressure for 30 minutes. The products display the following properties when tested in water at 25° C.:

| Parts of curing agent | 1 | 2 | 4 |
|---|---|---|---|
| Tensile strength at the break, lbs./sq. in | 1,390 | 1,530 | 2,920 |
| Modulus at 300% elongation, lbs./sq. in | 1,080 | 1,050 | 1,360 |
| Elongation at the break, percent | 430 | 490 | 530 |

It will be noted that the tensile strength improves with increasing amounts of di(3-isocyanato-4-methylphenyl) urea.

Example 3

A sample of polymer prepared as in Example 1 is stabilized by milling with 4 parts of piperidine per 100 parts of polymer.

Five days later 100 parts of the stabilized polymer are milled with 16 parts of di(3-isocyanato-4-methylphenyl) urea and then cured at 134° C. in a mold under pressure for 30 minutes. The smooth, amber, rubbery slab shows the following properties when tested at 25° C. in water:

Tensile strength at the break, lbs./sq. in _____ 5000
Modulus at 300% elongation, lbs./sq. in _____ 2640
Elongation at the break, percent _____ 450

Example 4

One mole of a polytetramethylene ether glycol having an average molecular weight of 2830, an acid number of 1.4 and containing 0.37 mole of water is heated in a W-P mixer for one hour at 80–100° C. with 2.14 moles of 2,4-tolylene diisocyanate. There are then added 1.09 moles of water and milling is continued for about 12 minutes at the same temperature. The rubbery mass is removed from the mill and stabilized by milling on a rubber mill with 0.75 part of piperidine per hundred parts of polymer.

Two portions of the resulting product are separately milled with 3.7 parts and 18.5 parts of di(3-isocyanato-4-methylphenyl) urea, respectively, for each hundred parts of reaction product. The compounded polymers are cured at 134° C. under pressure in molds for 30 minutes. The cured elastomers have the following properties:

| Parts di(3-isocyanato-4-methylphenyl) urea | 3.7 | 18.5 |
|---|---|---|
| Tensile strength at break, lbs./sq. in | 4,930 | 5,110 |
| Modulus at 300% elongation, lbs./sq. in | 540 | 1,530 |
| Elongation at the break, percent | 650 | 480 |
| Yerzley resilience | 81 | 68 |
| Hardness | 68 | 84 |

Example 5

The uncured product of Example 4 is milled with 7.4 parts of di(3-isocyanato-4-methylphenyl) urea per 100 parts of stabilized polymer. Portions are then cured in molds under pressure for the times and at the temperatures shown below.

| No | 1 | 2 | 3 | 4 | 5 | 6 | 7 | 8 |
|---|---|---|---|---|---|---|---|---|
| Time of cure, mins | 30 | 60 | 15 | 30 | 45 | 60 | 15 | 30 |
| Temperature of cure, °C | 126 | 126 | 134 | 134 | 134 | 134 | 150 | 150 |
| Tests at 25° C. in water: | | | | | | | | |
| Tensile strength, lbs./sq. in | >5,110 | >5,110 | 4,630 | 4,260 | 4,350 | 4,260 | 3,750 | 5,110 |
| Modulus at 300% elongation lbs./sq. in | 740 | 850 | 850 | 800 | 910 | 850 | 570 | 800 |
| Elongation at break, percent | >580 | 580 | 540 | 530 | 520 | 580 | 630 | 600 |

Example 6

One mole of a polytetramethylene ether glycol having an average molecular weight of 2900, an acid number of 1.0, and containing 0.38 mole of water, is milled in a W-P mixer at 80–100° C. for an hour with 2.34 moles of 2,4-tolylene diisocyanate. There are then added 1.17 moles of water and milling is continued for a period at the same temperature. The mass is removed from the mill and stabilized by incorporating with it 0.94 part of piperidine per hundred parts of polymer. A portion of the stabilized polymer is milled with 4 parts of di(3-isocyanato-4-methylphenyl) urea per hundred parts of polymer and portions are cured at the times and temperatures shown below.

| No | 1 | 2 | 3 | 4 | 5 | 6 |
|---|---|---|---|---|---|---|
| Time of cure, hours | 0.5 | 1.0 | 4.0 | 8.0 | 0.5 | 1.0 |
| Temperature of cure, °C | 100 | 100 | 100 | 100 | 134 | 134 |
| Tests at 25° C. in water: | | | | | | |
| Tensile strength, lbs./sq. in | 2,840 | 4,540 | 4,970 | 4,930 | 4,400 | 4,400 |
| Modulus at 300% elongation, lbs./sq. in | 284 | 540 | 650 | 650 | 620 | 570 |
| Elongation at break, percent | 800 | 700 | 620 | 620 | 610 | 680 |

It will be observed that there is little benefit in heating for more than 1 hour at 100° C.

Example 7

One mole of a polytetramethylene ether glycol having an average molecular weight of 1180, an acid number of 0.35, and containing 0.06 mole of water, is mixed at a temperature ranging from 80–100° C. in a W-P mixer for one hour with 2.11 moles of 2,4-tolylene diisocyanate. There are then added 1.4 moles of water and mixing is continued for 12 minutes. At the end of this time the rubbery mass is removed from the mixer and stabilized by milling with 2.15 parts of piperidine for each hundred parts of polymer.

100-part portions are then milled separately with 7.4 and 14.8 parts of di(3-isocyanato-4-methylphenyl) urea on a mill at 35–40° C. for 10 minutes. The compounded polymers are then cured in molds under pressure at 134° C. for 30 minutes. The resulting amber, rubbery slabs have the following properties:

| Parts di (3-isocyanato-4-methylphenyl) urea | 7.4 | 14.8 |
|---|---|---|
| Tensile strength at break, lbs./sq. in | 2,870 | 2,360 |
| Modulus at 300% elongation, lbs./sq. in | 1,310 | |
| Elongation at break, percent | 400 | 220 |

Example 8

Into a W-P mixer is placed 1 molar part of a polytetramethylene ether glycol of average molecular weight 3100 and the mixer is heated to about 80–85° C., at which temperature the glycol is liquid. There are then added 1.67 molar parts of 2,4-tolylene diisocyanate and 0.905 molar part of water. The charge is milled at 100° C. for 10 minutes and at 135° C. for an additional 1 hour and 15 minutes. The rubbery mass is cooled to below 100° C., removed from the mixer and milled on a cold rubber mill to a smooth band. There are added on the mill 8 parts of di(3-isocyanato-4-methylphenyl) urea per hundred parts of polymer. A portion is then put in a mold and cured in a press for 60 minutes at 134° C. Rings of the amber-colored rubbery polymer which result have the following properties in water at 25° C.:

Tensile strength at the break, lbs./sq. in _____ >5110
Modulus at 300% elongation, lbs./sq. in _____ 680
Elongation at the break, percent _____ >620

Example 9

One molar part of a polytetramethylene ether glycol having an average molecular weight of 2800 is placed in a W-P mixer and heated to about 80–85° C., at which temperature it is liquid. There are then added 2.3 molar parts of m-phenylene diisocyanate and the temperature is raised to 100° C. Milling is carried out for 2 hours, the mixer being closed during this time. The charge is then cooled slightly, 1.15 molar parts of water are added, the mill is closed and heated to 100° C., and milling is continued for 1.75 hours. The resulting rubbery mass is removed from the mixer and milled out into a smooth band on a cold rubber mill. It is stabilized by addition of 1 part of piperidine per hundred parts of polymer. For each 100 parts of polymer on the mill there are then added 5 parts of di(3-isocyanato-4-methylphenyl) urea, which is thoroughly milled into the polymer. A portion is placed in a mold and cured in a press for 30 minutes at 134° C. The resulting rubbery rings have the following properties when tested in water at 25° C.:

Tensile strength at the break, lbs./sq. in _____ 1360
Modulus at 300% elongation, lbs./sq. in _____ 570
Elongation at the break, percent _____ 650

Example 10

One mole of a polytetramethylene ether glycol having an average molecular weight of 2435, an acid number of 0.4, and containing 0.34 mole of water, is heated for an hour at 75–95° C. in a W-P mixer with 2.1 moles of 2,4-tolylene diisocyanate. There are added 1.09 moles of water and the mass is mixed for an additional 12 minutes. The mass is removed from the mixer and stabilized by the addition of 1.05 parts of piperidine per hundred parts of polymer.

One hundred (100) parts of the polymer are put on a rubber mill and 5 parts of di(3-isocyanato-4-chlorophenyl) urea are thoroughly milled in. A portion is put in a mold and cured in a press at 134° C. for 30 minutes. The resulting elastomer has the following properties at 25° C. in water:

Tensile strength at the break, lbs./sq. in _____ 2820
Modulus at 300% elongation, lbs./sq. in _____ 284
Elongation at the break, percent _____ 650

Example 11

One hundred (100) parts of the stabilized polymer of Example 10 are put on a rubber mill and 5 parts of di(3-isocyanato-4-methoxyphenyl) urea are thoroughly milled in. A portion is then placed in a mold and cured in a press for 60 minutes at 134° C. The resulting elastomer has the following properties:

Tensile strength at the break, lbs./sq. in _____ 4540
Modulus at 300% elongation, lbs./sq. in _____ 284
Elongation at the break, percent _____ 820

Example 12

A reaction product is made by the procedure described in Example 10 except using 1 mole of a polytetramethylene ether glycol having an average molecular weight of 3325, an acid number of 1.0, and containing 0.18% water, 2.1 moles of 2,4-tolylene diisocyanate, and 1.09 moles of water. The reaction product is stabilized with 0.82 part of piperidine per hundred parts of polymer.

One hundred (100) parts of this polymer are milled on a rubber mill with 6 parts of the dimer of 2,4-tolylene diisocyanate until thoroughly mixed. A second 100 parts are similarly milled with 6 parts of di(3-isocyanato-4-methylphenyl) urea.

Equal weights of the two portions are milled on a 2 x 6 inch rubber mill at 100° and at 130° C. until definite scorching occurs, i. e., until persistent holes in the band are formed. The times required for this to occur are:

| Curing agent | Minutes to scorch | |
|---|---|---|
| | at 100° C. | at 130° C. |
| Dimer of 2,4-tolylene diisocyanate | 43 | 14 |
| Di(3-isocyanato-4-methylphenyl) urea | 78 | 22 |

Example 13

One mole of a polytetramethylene ether glycol having an average molecular weight of 2900 and containing 0.34 mole of water is put in a W-P mixer with 2.1 moles of 2,4-tolylene diisocyanate and the temperature is gradually raised from an initial 35° C. to 83° C. over a period of 3 hours. The mass is then cooled to 80° C. and 1.09 moles of water are added and milling is continued for an additional 75 minutes during which time the temperature is raised from 80° C. to about 105° C. The mass is now in the form of rubbery chunks. It is removed from the W-P mixer and put on a rubber mill and milled to a smooth band. During this time there is added 0.57 part of piperidine per hundred parts of polymer on the mill to stabilize it.

One hundred (100 parts) by weight of the polymer are milled to a smooth band on a rubber mill and 4.4 parts of di(3-isocyanato-4-methoxyphenyl) urea are thoroughly milled in. A portion is put in a ring mold and cured at 125° C. for 60 minutes in a press. The resulting rings have the following properties at 25° C. in water:

Tensile strength at the break, lbs./sq. in _____ 4200
Modulus at 300% elongation, lbs./sq. in _____ 400
Elongation at the break, percent _____ 730

A second 100 parts of the uncured polymer are similarly compounded with 2.35 parts of 1-methoxy-2,4-phenylene diisocyanate. This provides the same number of isocyanate groups as were added to the first stock. Each of the compoundeed polymers is then placed on a 2 x 6 inch rubber mill at 130° C. and milled until persistent holes appear in the band, i. e., until scorching is apparent. The second stock scorches in 22 minutes while the first, containing the di(3-isocyanato-4-methoxyphenyl) urea curing agent, does not scorch until after 69 minutes of milling.

Example 14

One hundred (100) parts of a polytetramethylene ether glycol having an average molecular weight of 3150, an acid number of 1.5, and containing 0.078% water, are mixed with 0.243 part of water in a W-P mixer at 100° C. for 15 minutes and then 9.98 parts of 1-chloro-2,4-phenylene diisocyanate (93% purity) are added. Mixing is continued at 100° C. for 4 hours. The mass is then removed from the mixer and milled to a soft smooth sheet on a rubber mill at room temperature. It is stable and remains millable.

One hundred (100) parts of the product are milled to homogeneity with 5 parts of di(3-isocyanato-4-methylphenyl) urea. A portion is put in a mold and cured in a press for 30 minutes at 134° C. Rings of the polymer are tested at 25° C. and have the following properties:

| | |
|---|---|
| Tensile strength at the break, lbs./sq. in | 3000 |
| Modulus at 300% elongation, lbs./sq. in | 230 |
| Elongation at the break, percent | 670 |

Example 15

1060 parts of a polytetramethylene ether glycol having an average molecular weight of 2900, and containing 0.056% water are put in a W-P mixer and heated to 100° C. There are added 95.4 parts of 2,4-tolylene diisocyanate and mixing is continued at 100° C. for 2.5 hours. There are then added 44.6 parts of m-tolylenediamine and mixing is continued for an additional 30 minutes. The rubbery mass is removed and sheeted out on a rubber mill.

One hundred (100) parts of the polymer are banded out on a rubber mill and 8 parts of di(3-isocyanato-4-methylphenyl) urea are thoroughly milled in. A portion is put in a mold and cured in a press at 134° C. for 30 minutes. Quarter inch strips are cut from the resulting rubbery slab and tested in air, giving the following results:

| | |
|---|---|
| Tensile strength at the break, lbs./sq. in | 5230 |
| Modulus at 300% elongation, lbs./sq. in | 1710 |
| Elongation at the break, percent | 450 |

Example 16

One hundred (100) parts of polytetramethylene ether glycol having an average molecular weight of 2800 are mixed in a W-P mixer with 0.372 part of water for 15 minutes at 45° C. There are added 9.50 parts of hexamethylene diisocyanate (95% purity) and mixing is continued at 45° C. for 45 minutes, at 70° C. for 45 minutes and at 100° C. for 4.75 hours. The rubbery polymer is removed from the mixer and milled to a smooth band on a rubber mill. It is stable and still millable after 30 days.

One hundred (100) parts of the product are milled with 5 parts of di(3-isocyanato-4-methylphenyl) urea on a rubber mill. A portion is put in a mold and cured in a press at 134° C. for 30 minutes. Rings of the polymer are tested at 25° C. in water with the following results:

| | |
|---|---|
| Tensile strength at the break, lbs./sq. in | 2500 |
| Modulus at 300% elongation, lbs./sq. in | 170 |
| Elongation at the break, percent | 600 |

Example 17

A polyester is prepared by mixing 4375 parts of adipic acid, 2125 parts of ethylene glycol, 925 parts of propylene glycol and 0.5 part of p-toluene sulfonic acid and heating for 10 hours, gradually increasing the temperature from 140° C. to 220° C. During this time water, along with some glycol, distills off. The mass is then heated for 8 hours at 200–220° C. under a pressure of 1 mm. of mercury while a slow stream of nitrogen is allowed to sweep through the system. The resulting polyester has a hydroxyl number of 59 and an acid number of 0.2.

120 parts of this polyester and 20.3 parts of diphenyl-4,4'-diisocyanate are mixed in a Werner-Pfleiderer mixer at 125–130° C. for 2 hours. The mass is cooled to 90° C. and is of a stringy, taffy-like consistency. There are added 2.7 parts of 2,4-diaminotoluene and mixing is continued for 30 minutes at 100° C. The resulting doughy mass is milled to a sheet on a rubber mill.

Ten parts of this polymer are milled with 0.6 part of di(3-isocyanato-4-methylphenyl) urea on a rubber mill and cured in a mold under pressure at 130° C. for 45 minutes. A rubbery, snappy slab is obtained.

In the same way, 10 parts of polymer are cured with 0.3 part of 2,4-tolylene diisocyanate. The number of —NCO groups available for curing is the same in both cases.

The two products are tested and show the following results:

| | Curing agent | |
|---|---|---|
| | Di(3-isocyanato-4-methylphenyl)-urea | Tolylene diisocyanate |
| Properties at 25° C.: | | |
| Tensile strength at break, lbs./sq. in | 5,500 | 3,500 |
| Modulus at 300% elongation, lbs./sq. in | 1,250 | 900 |
| Elongation at the break, percent | 650 | 660 |
| Properties at 70° C.: | | |
| Tensile strength at break, lbs./sq. in | 4,200 | 2,300 |
| Modulus at 300% elongation, lbs./sq. in | 675 | 625 |
| Elongation at the break, percent | 810 | 800 |

The considerable improvement in tensile strength due to the di(3-isocyanato-4-methylphenyl) urea is evident. The increased modulus is possibly due to the added —NHCONH— group.

Example 18

875 parts of adipic acid, 375 parts of ethylene glycol, 140 parts of propylene glycol, and 0.1 part of p-toluene sulfonic acid are heated gradually from 140° to 230° C. over a period of 10 hours, while water and some glycol distill off. The mass is heated under vacuum at an absolute pressure of 1 mm. of mercury for 8 hours at 200–220° C. while a slow stream of nitrogen is passed through the system. The resulting polyester has a hydroxyl number of 52.2 and an acid number of 0.4.

100 parts of the above polyester and 12.8 parts of naphthalene-1,5-diisocyanate are mixed in a Werner-Pfleiderer mixer at 130° C. for 2 hours. The somewhat stringy, taffy-like mass is cooled to 100° C. and 2.1 parts of m-phenylene diamine are added. Mixing is continued for 30 minutes at 90–100° C. A soft rubbery crepe is obtained which is milled out to a sheet on a rubber mill.

10 parts of the polymer are milled with 0.7 part di(3-isocyanato-4-methylphenyl) urea and the mixture is cured by heating in a mold in a press at 130° C. for 30 minutes.

In the same way 10 parts of polymer are cured with 0.7 part of the dimer of 2,4-tolylene diisocyanate.

The rubbery slabs are tested with the following results:

| | Cured with— | |
|---|---|---|
| | Substituted Urea | Dimer |
| Properties at 25° C.: | | |
| Tensile strength at break, lbs./sq. in | 4,500 | 2,400 |
| Modulus at 300% elongation, lbs./sq. in | 1,050 | 1,550 |
| Elongation at the break, percent | 650 | 400 |
| Properties at 70° C.: | | |
| Tensile strength at break, lbs./sq. in | 3,400 | 1,650 |
| Modulus at 300% elongation, lbs./sq. in | 800 | 1,200 |
| Elongation at the break, percent | 800 | 380 |

Although this invention is particularly useful and has been illustrated with particular reference to elastomers formed from polyalkylene ether glycols, diisocyanates and chain-extending agents, it has application generally to the curing of any elastomeric materials composed of polymeric chains containing reactive hydrogen atoms and which may be cured by cross-linking at the active hydrogen sites.

Although the curing agents of this invention have some structural resemblance to diisocyanate dimers which have been used heretofore in the curing of such polymers, the present agents unexpectedly permit longer milling of the polymer without scorching than is possible with the corresponding dimers. The di(isocyanatoaryl) ureas are high melting solids having low vapor pressures and are consequently less toxic and less hazardous to handle than the diisocyanates from which they are formed. They are also less susceptible to undesired reaction with atmospheric moisture.

Some uncured elastomers of the type here considered may be milled to a smooth band on a cold mill, i. e., one to which no heat is applied, although the actual temperature may build up to as high as 50° C. by friction. On the other hand, with some elastomers it is necessary to heat the mill to around 100° C. in order to obtain a smooth band. The tendency for scorching to take place is greater at the higher temperatures and under these conditions, the use of the di(isocyanatoaryl) ureas is of particular value.

The cured elastomers prepared according to the present process may be used for the same purposes as other elastomers. From them may be prepared such articles as tires, inner tubes, belts, hose and tubes, wire and cable jackets, footwear, sponge, coated fabric and various other molded or dipped articles. The products made according to this process have excellent resistance to freezing, heat, direct sunlight, oxygen and ozone, oil and other hydrocarbon solvents, and to mechanical abrasion, flexing, stretching and the like.

The basic elastomeric properties of these products may be varied by suitable compounding. The type and amount of the compounding agent to be used is dependent upon the use for which the elastomer is intended. Some of the more important compounding agents which are of value with these elastomers are carbon black, clay, silica, talc, zinc and magnesium oxides, calcium and magnesium titanium dioxide and plasticizers. Inorganic and organic coloring agents may be incorporated to give well defined colored products. The natural color of the elastomer is a pale yellow or a light amber.

The compounding agents may be mixed or incorporated with the product at the same time that the diisocyanate vulcanizing agent is added. Conventional rubber processing machinery such as rubber mills and Werner-Pfleiderer or Banbury mixers may be used. The resulting compounded stocks may be shaped or cured in conventional rubber industry equipment. Alternatively the stocks may be dissolved or extended with solvents for application to surfaces upon which they may be cured after evaporation of the solvent.

This application is a continuation-in-part of my copending application Serial No. 365,269, filed June 30, 1953, now abandoned.

I claim:

1. In a process of making cured polyurethane elastomers, the steps which comprise mixing (a) 100 parts by weight of an isocyanate-curable, uncured polyurethane elastomeric reaction product containing substantially no free isocyanate groups and containing a plurality of intralinear groups having formula weights of at least 732 and selected from the class consisting of polyoxyalkylene and polyester groups, said reaction product containing a plurality of urethane linkages of the formula,

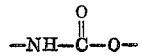

with said intralinear polyoxyalkylene and polyester groups being connected to the terminal oxygen atom of said linkages, with (b) from 1 to 20 parts by weight of a di(isocyanatoaryl) urea having the formula:

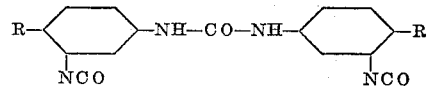

in which R represents a member of the class consisting of lower alkyl and lower alkoxy radicals and chlorine atoms, and thereafter heating the mixture at a temperature between 80 and 175° C. to produce a vulcanized elastomer.

2. The process of claim 1 in which the uncured polyurethane product is the reaction product of a polyalkylene ether glycol having a molecular weight of at least 750, a molar excess of an organic diisocyanate, and a chain-extending agent containing a plurality of active hydrogen atoms, no more than two atoms in the molecule having active hydrogen attached thereto.

3. The process of claim 1 in which the uncured polyurethane product is the reaction product of a polyester of at least one glycol and at least one dicarboxylic acid, said polyester containing terminal hydroxyl groups, a molar excess of an organic diisocyanate, and a chain-extending agent containing a plurality of active hydrogen atoms, no more than two atoms in the molecule having active hydrogen attached thereto.

4. The process of claim 3 in which the polyester is a reaction product of ethylene glycol, propylene glycol and adipic acid.

5. The process of claim 1 in which the di(isocyanatoaryl) urea is di(3-isocyanato-4-methylphenyl) urea.

6. The process of claim 1 in which the di(isocyanatoaryl) urea is di(3-isocyanato-4-chlorophenyl) urea.

7. The process of claim 1 in which the di(isocyanatoaryl) urea is di(3-isocyanato-4-methoxy) urea.

8. In a process for making cured elastomers, the steps which comprise mixing (a) 100 parts by weight of an uncured reaction product of a polyalkylene ether glycol having a molecular weight of at least 750, an aromatic diisocyanate and water, said reaction product containing substantially no free isocyanate groups, with (b) from 1 to 20 parts by weight of di(3-isocyanato-4-methylphenyl) urea, and thereafter heating the mixture at a temperature between 90 and 150° C. to produce a vulcanized elastomer.

9. In a process for making cured elastomers, the steps which comprise mixing (a) 100 parts by weight of an uncured reaction product of a polytetramethylene ether glycol having a molecular weight between 750 and 3500, 2,4-tolylene diisocyanate and water, said reaction product containing substantially no free isocyanate groups, with (b) from 1 to 20 parts by weight of di(3-isocyanato-4-methylphenyl) urea, and thereafter heating the mixture at a temperature between 90 and 150° C. to produce a vulcanized elastomer.

10. A cured elastomer obtained by the process of claim 1.

11. A process according to claim 1 in which the heating step is carried out in a mold under pressure to form a shaped, vulcanized elastomer.

12. A shaped, vulcanized elastomer obtained by the process of claim 11.

13. In a process for making cured elastomers, the steps which comprise mixing (a) 100 parts by weight of an uncured reaction product of a polyalkylene ether glycol having a molecular weight of at least 750, a molar excess of an aromatic diisocyanate and water, said reaction product being stabilized against premature curing by the addition of piperidine with (b) from 1 to 20 parts by weight of di(3-isocyanato-4-methylphenyl) urea, and thereafter heating the mixture at a temperature between 90 and 150° C. to produce a vulcanized elastomer.

14. The process of claim 13 wherein the polyalkylene ether glycol is a polytetramethylene ether glycol, having a molecular weight between 750 and 3500, and the aromatic diisocyanate is 2,4-tolylene diisocyanate.

References Cited in the file of this patent

UNITED STATES PATENTS

| | | |
|---|---|---|
| 2,597,025 | Orth | May 20, 1952 |
| 2,621,166 | Schmidt et al. | Dec. 9, 1952 |
| 2,692,874 | Langerak | Oct. 26, 1954 |

U. S. DEPARTMENT OF COMMERCE

PATENT OFFICE

CERTIFICATE OF CORRECTION

Patent No. 2,818,404                  December 31, 1957

Frederick B. Hill, Jr.

It is hereby certified that error appears in the printed specification of the above numbered patent requiring correction and that the said Letters Patent should read as corrected below.

Column 1, line 70, for "curring" read --curing--; column 4, line 59, for "could" read --would--; column 12, line 40, for "di(3-isocyanato-4-methoxy)" read --di(3-isocyanato-4-methoxyphenyl)--.

Signed and sealed this 25th day of February 1958.

(SEAL)

Attest:
KARL H. AXLINE

Attesting Officer

ROBERT C. WATSON
Commissioner of Patents